United States Patent
Ma et al.

(10) Patent No.: US 10,042,650 B2
(45) Date of Patent: Aug. 7, 2018

(54) COMPUTER STARTUP METHOD, STARTUP APPARATUS, STATE TRANSITION METHOD AND STATE TRANSITION APPARATUS

(75) Inventors: Binqiang Ma, Beijing (CN); Xiaoyi Feng, Beijing (CN); Huijun Wu, Beijing (CN); Jingang Peng, Beijing (CN); Xuguo Liu, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 393 days.

(21) Appl. No.: 14/006,184

(22) PCT Filed: Mar. 19, 2012

(86) PCT No.: PCT/CN2012/072531
§ 371 (c)(1),
(2), (4) Date: Sep. 19, 2013

(87) PCT Pub. No.: WO2012/126345
PCT Pub. Date: Sep. 27, 2012

(65) Prior Publication Data
US 2014/0019740 A1   Jan. 16, 2014

(30) Foreign Application Priority Data

Mar. 23, 2011 (CN) .......................... 2011 1 0071096
May 31, 2011 (CN) .......................... 2011 1 0144830

(51) Int. Cl.
*G06F 1/32*   (2006.01)
*G06F 9/4401*   (2018.01)

(52) U.S. Cl.
CPC .............. *G06F 9/4406* (2013.01); *G06F 1/32* (2013.01); *G06F 1/3206* (2013.01);
(Continued)

(58) Field of Classification Search
None
See application file for complete search history.

(56) References Cited

U.S. PATENT DOCUMENTS 6,230,274 B1 * 5/2001 Stevens ............... G06F 11/1441
710/10
2002/0087816 A1 * 7/2002 Atkinson ................ G06F 12/08
711/156

(Continued)

FOREIGN PATENT DOCUMENTS

CN    1746815 A    3/2006
CN    101000549 A    7/2007

(Continued)

OTHER PUBLICATIONS

Second Office Action dated Mar. 6, 2015 from corresponding Chinese Application No. CN 201110071096.7 (13 pages including English translation).

(Continued)

*Primary Examiner* — Paul Yanchus, III
(74) *Attorney, Agent, or Firm* — Brinks Gilson & Lione; John C. Freeman

(57) ABSTRACT

A computer startup method, a startup apparatus, a state transition method, and a state transition apparatus are described. When the computer is in a suspend-to-RAM (STR) state, the power consumption is a first power consumption. When the computer transitions from the suspend-to-disk (STD) state to the startup state, the time consumption is a first time consumption. The state transition method includes, when the computer is in the startup state, obtaining a first power state transition command to instruct the computer to transition from the startup state to a specific state; and to respond to the first power state transition command, making the computer to be in the specific state.

13 Claims, 4 Drawing Sheets

(52) U.S. Cl.
CPC .......... *G06F 1/3287* (2013.01); *G06F 9/4418* (2013.01); *Y02D 10/171* (2018.01); *Y02D 10/44* (2018.01)

(56) References Cited

U.S. PATENT DOCUMENTS

| | | | | |
|---|---|---|---|---|
| 2003/0226043 | A1* | 12/2003 | Hicok | G06F 1/3203 713/300 |
| 2007/0219644 | A1* | 9/2007 | Sonobe | G06F 1/206 700/12 |
| 2009/0106573 | A1* | 4/2009 | Lin | G06F 1/3287 713/324 |
| 2010/0115309 | A1 | 5/2010 | Carvalho et al. | |
| 2010/0262849 | A1* | 10/2010 | Chan | G06F 1/3203 713/320 |
| 2010/0262853 | A1 | 10/2010 | Goda | |

FOREIGN PATENT DOCUMENTS

| | | |
|---|---|---|
| CN | 101246389 A | 8/2008 |
| CN | 101441504 | 5/2009 |
| CN | 101866301 | 10/2010 |
| CN | 101907918 | 12/2010 |
| CN | 101911031 A | 12/2010 |
| WO | WO2008/117133 | 10/2008 |
| WO | WO 2008/117133 A1 | 10/2008 |

OTHER PUBLICATIONS

Second Office Action dated Jan. 29, 2015 from corresponding Chinese Application No. CN 201110144830.8 (25 pages including English translation).

Third Office Action dated May 6, 2015 from corresponding Chinese Application No. CN 201110144830.8 (12 pages including English translation).

PCT/CN2012/072531 International Search Report dated May 3I, 2012 (3 pages).

First Office Action dated Jun. 25, 2014 from corresponding Chinese Application No. CN 201110071096.7 (14 pages including English translation).

First Office Action dated Aug. 4, 2014 from corresponding Chinese Application No. CN 201110144830.8 (25 pages including English translation).

Third Office Action dated Sep. 9, 2015 out of corresponding Chinese Patent Application No. 201110071096.7 (11 pages including English translation).

\* cited by examiner

COMPUTER STARTUP METHOD, STARTUP APPARATUS, STATE TRANSITION METHOD AND STATE TRANSITION APPARATUS

This application claims priority to International Application No. PCT/CN2012/072531 filed Mar. 19, 2012; Chinese application no. 201110071096.7 filed Mar. 23, 2011; and Chinese application no. 201110144830.8 filed May 31, 2011, the entire contents of each are incorporated herein by reference.

BACKGROUND

The present disclosure relates to the computer field, especially to a computer startup method, a startup apparatus, a state transition method, and a state transition apparatus.

It is always a problem in the computer field about how to start up a computer system fast. The fast startup of an operating system (OS) comprises a fast BIOS (Basic Input Output System) startup stage and a fast OS load stage. Due to the difference between different operating platforms, it is always a difficult problem to startup BIOS fast.

Currently, the method for starting up BIOS fast comprises the following aspects.

Firstly, codes for a device that does not need to be supported by the computer are removed when starting up. For example, codes for a soft drive are removed in BIOS when it is not necessary to support the soft drive in the system, so that it is not necessary to detect the codes for the soft drive, thereby reducing the startup time. However, the startup speed that can be improved by such method is limited, because there are not too many devices removable for the computer system.

Secondly, the hardware configuration is fixed. For example, the memory configuration is fixed. In this way, it is not necessary to conduct the detection in the startup process. However, still, this startup method cannot improve the startup speed effectively, and this method is only suitable for a computer platform with a fixed configuration.

On the other hand, currently, the OS based on the X86 architecture is very bulky, and the speed for powering on/off is very slow. The long time consumption in the normal powering on/off mode impairs the user experience.

In order to improve the startup speed, multiple modes comprising the S3 mode and the S4 mode are set up in the prior art. In the S3 mode (suspend-on-RAM (STR) mode), the system can recover to the previous mode fast. However, in order to ensure that the system can recover to the previous mode fast, a part of devices, such as the memory, the memory controller, the Platform Controller Hub (PCH), are still in the work state, and thus consume power.

In the S4 mode (suspend-to-disk (STD) mode), data for recovering to the previous state is stored in the hard disk, so the number of the devices that need to be powered is reduced. However, since data needs to be read out from the hard disk and loaded to the memory, the startup time is relatively long.

SUMMARY

In view of the above, the embodiments of the disclosure provide a computer startup method, a startup apparatus, a state transition method, and a state transition apparatus, which enables a fast recovery of the system state while further reducing the power consumption.

According to an aspect of the present disclosure, a computer state transition method applied to a computer, the power consumption of the computer is a first power consumption when the computer is in a suspend-on-RAM (STR) state, and the time consumption of the computer is a first time consumption when it transits from the suspend-to-disk (STD) state to a start state, the computer state transition method comprises the steps of: obtaining a first power state transition command for instructing the computer to transit from the start state to a specific state, when the computer is in the start state; and causing the computer to be in the specific state in response to the first power state transition command; wherein, the power consumption of the computer in the specific state is a second power consumption less than the first power consumption, and the time consumption when the computer transits from the specific state to the start state is a second time consumption less than the first time consumption.

The computer state transition method further comprises: obtaining a second power state transition command for instructing the computer to transit from the specific state to the start state, when the computer is in the specific state; and recovering the computer to be in the start state in response to the second power state transition command.

The step of causing the computer to be in the specific state in response to the first power state transition command comprises: storing configuration information of a peripheral device in a memory; storing state information of a Platform Controller Hub (PCH) to a Non-Volatile Random Access Memory (NVRAM); controlling the power supply so that only the power supplies to the memory and a memory controller are maintained; the step of recovering the computer to be in the start state in response to the second power state transition command comprises: recovering all the power supplies; reading out the PCH state information from the NVRAM and recovering the PCH state configuration in accordance with the read PCH state information; recovering configuration of the peripheral device in accordance with the configuration information recorded in the memory; and recovering an operating system and an application in accordance with data recorded in the memory.

The step of causing the computer to be in the specific state in response to the first power state transition command comprises: storing configuration information of a peripheral device in a memory; setting the memory to be in a self-refresh mode; storing state information of a Platform Controller Hub (PCH) to a Non-Volatile Random Access Memory (NVRAM); controlling the power supply so that only the power supply to the memory is maintained; the step of recovering the computer to be in the start state in response to the second power state transition command comprises: recovering all the power supplies; reading out the PCH state information from the NVRAM and recovering the PCH state configuration in accordance with the read PCH state information; switching the memory from the self-refresh mode into a normal mode, and ensuring data recorded in the memory unchanged; recovering configuration of the peripheral device in accordance with the configuration information recorded in the memory; and recovering an operating system and an application in accordance with the data recorded in the memory.

The step of causing the computer to be in the specific state in response to the first power state transition command comprises: storing configuration information of a peripheral device in a memory; setting the memory to be in a self-refresh mode; controlling the power supply so that only the power supplies to the memory and a Platform Controller Hub (PCH) are maintained; the step of recovering the computer to be in the start state in response to the second power state transition command comprises: recovering all the power supplies; switching the memory from the self-refresh mode into a normal mode, and ensuring data recorded in the memory unchanged; recovering configuration of the peripheral device in accordance with the configuration information recorded in the memory; and recovering an operating system and an application in accordance with the data recorded in the memory.

The step of causing the computer to be in the specific state in response to the first power state transition command further comprises: storing a state identifier identifying that the computer has transited to the specific state at a predetermined location; wherein, in the step of obtaining the second power state transition command when the computer is in the specific state, the computer is determined to be in the specific state based on the state identifier.

According to another aspect of the present disclosure, a computer state transition apparatus applied to a computer is provided, the power consumption of the computer is a first power consumption when it is in a suspend-on-RAM (STR) state, and the time consumption of the computer is a first time consumption when it transits from the suspend-to-disk (STD) state to a start state, the computer state transition apparatus comprises: a first command obtaining module configured for obtaining a first power state transition command for instructing the computer to transit from the start state to a specific state, when the computer is in the start state; and a first responding module configured for causing the computer to be in the specific state in response to the first power state transition command; wherein, the power consumption of the computer in the specific state is a second power consumption less than the first power consumption, and the time consumption when the computer transits from the specific state to the start state is a second time consumption less than the first time consumption.

The computer state transition apparatus further comprises: a second command obtaining module configured for obtaining a second power state transition command for instructing the computer to transit from the specific state to the start state, when the computer is in the specific state; and a second responding module configured for recovering the computer to be in the start state in response to the second power state transition command.

The first responding module comprises: a first saving unit configured for storing configuration information of a peripheral device in a memory; a second saving unit configured for storing state information of a Platform Controller Hub (PCH) to a Non-Volatile Random Access Memory (NVRAM); a first power supply controller configured for controlling the power supply so that only the power supplies to the memory and a memory controller are maintained; the second responding module comprises: a first recovering module configured for recovering all the power supplies; a second recovering module configured for reading out the PCH state information from the NVRAM and recovering the PCH state configuration in accordance with the read PCH state information; a third recovering module configured for recovering configuration of the peripheral device in accordance with the configuration information recorded in the memory; and a fourth recovering module configured for recovering an operating system and an application in accordance with data recorded in the memory.

The first responding module comprises: a first saving unit configured for storing configuration information of a peripheral device in a memory; a first memory mode setting module configured for setting the memory to be in a self-refresh mode; a second saving unit configured for storing state information of a Platform Controller Hub (PCH) to a Non-Volatile Random Access Memory (NVRAM); a second power supply controller configured for controlling the power supply so that only the power supply to the memory is maintained; the second responding module comprises: a first recovering module configured for recovering all the power supplies; a second recovering module configured for reading out the PCH state information from the NVRAM and recovering the PCH state configuration in accordance with the read PCH state information; a second memory mode configuring module configured for switching the memory from the self-refresh mode into a normal mode, and ensuring data recorded in the memory unchanged; a third recovering module configured for recovering configuration of the peripheral device in accordance with the configuration information recorded in the memory; and a fourth recovering module configured for recovering an operating system and an application in accordance with the data recorded in the memory.

The first responding module comprises: a first saving unit configured for storing configuration information of a peripheral device in a memory; a first memory mode setting module configured for setting the memory to be in a self-refresh mode; a third power supply controller configured for controlling the power supply so that only the power supplies to the memory and a Platform Controller Hub (PCH) are maintained; the second responding module comprises: a first recovering module configured for recovering all the power supplies; a second memory mode setting module configured for switching the memory from the self-refresh mode into a normal mode, and ensuring data recorded in the memory unchanged; a third recovering module configured for recovering configuration of the peripheral device in accordance with the configuration information recorded in the memory; and a fourth recovering module configured for recovering an operating system and an application in accordance with the data recorded in the memory.

According to another aspect of the present disclosure, a computer state transition method is provided, comprising: storing a preset starting identifier after receiving a predetermined command; storing configuration information of a peripheral device to a memory; storing PCH state information to a NVRAM to ensure that the computer can recover the PCH state configuration based on the PCH state information in the startup process; controlling the power supply so that only the power supply to the memory is maintained, or only the power supplies to the memory and the memory controller are maintained.

In the step of controlling the power supply, only the power supply to the memory is maintained, and the computer state transition method further comprises setting the memory to a self refresh mode.

The method further comprises: reading a startup identifier after receiving the start command; recovering all the power supplies if the read start identifier is the preset startup identifier; reading the PCH state information from the NVRAM, and recovering the PCH state configuration based on the read PCH state information; switching the memory from the self-refresh mode to the normal mode; and recovering the OS and the application based on the data recorded in the memory.

According to an aspect of the present disclosure, a computer is provided, the power consumption of the computer is a first power consumption when the computer is in a suspend-on-RAM (STR) state, and the time consumption of the computer is a first time consumption when it transits from the suspend-to-disk (STD) state to a start state, the computer comprises: a first command obtaining module configured for obtaining a first power state transition command for instructing the computer to transit from the start state to a specific state, when the computer is in the start state; and a first responding module configured for causing the computer to be in the specific state in response to the first power state transition command; wherein, the power consumption of the computer in the specific state is a second power consumption less than the first power consumption, and the time consumption when the computer transits from the specific state to the start state is a second time consumption less than the first time consumption.

The computer further comprises: a second command obtaining module configured for obtaining a second power state transition command for instructing the computer to transit from the specific state to the start state, when the computer is in the specific state; and a second responding module configured for recovering the computer to be in the start state in response to the second power state transition command.

The computer further comprises: a CPU; a memory; a memory controller; a NVRAM; an embedded controller; and a BIOS; the CPU storing configuration information of a peripheral device in a memory; the BIOS setting the memory to be in a self-refresh mode; the BIOS storing state information of a Platform Controller Hub (PCH) to a Non-Volatile Random Access Memory (NVRAM); the embedded controller controlling the power supply so that only the power supply to the memory is maintained; the embedded controller further recovering all the power supplies in response to the second power state transition command; reading out the PCH state information from the NVRAM and recovering the PCH state configuration in accordance with the read PCH state information; the embedded controller further switching the memory from the self-refresh mode into a normal mode, and ensuring data recorded in the memory unchanged; recovering configuration of the peripheral device in accordance with the configuration information recorded in the memory; and recovering an operating system and an application in accordance with the data recorded in the memory.

According to another aspect of the present disclosure, a startup method of a computer is provided, comprising the steps of: switching a hardware device from a start running state into a specific state different from a first state, when determining that an operating system is executing a state switch operation in the start running state to quit the control to the hardware device and is to make the hardware device to enter the first state, wherein the initialization time necessary for the hardware device to startup to the normal running from the specific state is a first duration, the initialization time necessary for the hardware device to startup to the normal running from the first state is a second duration, and the first duration is less than the second duration; starting up the hardware device from the specific state, when determining that the hardware device executes a starting operation.

The startup method further comprises the step of: setting an identifier for identifying the first state, after the step of determining that an operating system is executing a state switch operation in the start running state to quit the control to the hardware device.

The startup method further comprises the step of: detecting the identifier, and reloading the operating system based on the identifier or waking up the operating system directly, after the step of determining that the hardware device executes a starting action.

The step of detecting the identifier, and reloading the operating system based on the identifier comprises: deciding whether the identifier identifies that the first sate is a hibernation state or a power off state, reloading the operating system if the decision is positive, and waking up the operating system from the suspending state if the decision is negative.

According to another aspect of the present disclosure, a startup apparatus of a computer is provided, comprising: a first state determining module configured for determining the operating state of an operating system; a first executing module configured for switching a hardware device from a start running state into a specific state different from a first state, when determining that an operating system is executing a state switch action in the start running state to quit the control to the hardware device and is to make the hardware device to enter the first state, wherein the initialization time necessary for the hardware device to startup to the normal running from the specific state is a first duration, the initialization time necessary for the hardware device to startup to the normal running from the first state is a second duration, and the first duration is less than the second duration; a specific state determining module configured for determining the state of the hardware device; and a second executing module configured for starting up the hardware device from the specific state, when the specific state determining module determines that the hardware device executes a re-start action.

The first executing module is further configured for setting an identifier for identifying the first state.

The startup apparatus further comprises: a third state determining module configured for detecting the identifier, and deciding whether the identifier identifies that the first state is a hibernation state or a power off state.

The startup apparatus further comprises: a third executing module configured for reloading the operating system if the decision of the third state determining module is positive, and waking up the operating system from the suspending state if the decision of the third state determining module is negative.

According to another aspect of the present disclosure, a startup apparatus of a computer is provided, comprising: a first staring-up module configured for making the computer to start up to the running state from the power-off state in a normal way; a second starting up-module comprising: a first state determining module configured for determining the operating state of an operating system; a first executing module configured for switching a hardware device from a start running state into a specific state different from a first state, when determining that an operating system is executing a state switch action in the start running state to quit the control to the hardware device and is to make the hardware device to enter the first state, wherein the initialization time necessary for the hardware device to startup to the normal running from the specific state is a first duration, the initialization time necessary for the hardware device to startup to the normal running from the first state is a second duration, and the first duration is less than the second duration; a specific state determining module configured for determining the state of the hardware device; and a second executing module configured for starting up the hardware device from the specific state, when the specific state determining module determines that the hardware device executes a re-start action.

The first executing module is further configured for setting an identifier for identifying the first state; wherein, the second starting-up module further comprises: a third state determining module configured for detecting the identifier, and deciding whether the identifier identifies that the first state is a hibernation state or a power off state; a third executing module configured for reloading the operating system if the decision of the third state determining module is positive, and waking up the operating system from the suspending state if the decision of the third state determining module is negative.

The startup apparatus further comprises a startup mode selector comprising a first selection mode for executing the first starting-up module when being selected and a second selection mode for executing the second starting-up module when being selected.

In the computer state transition method and apparatus according to the embodiments of the present disclosure, by ensuring that data and PCH configuration information in the memory can be used in the recovery process while controlling the power supply to the memory controller and/or the PCH, the power consumption of the system is reduced while the recovery speed is improved.

In the computer startup method and system according to the embodiments of the present disclosure, when the OS performs state (such as the power off, the hibernation, the standby or the sleep) switching operations, the hardware device does not enter the first state desired by the OS directly according to the normal instruction of the OS, but enter the specific state. Since the necessary initialization operations starting up from the specific state by the hardware device are less than that starting up from the first state, the time starting up from the specific state is shorter than that from the first state. In this way, the hardware device starts up from the specific state when powering on next time, so that the hardware initialization process that is necessary when starting up from the first state is skipped, and the startup speed is greatly improved.

DETAILED DESCRIPTION

The embodiments of the present disclosure will be described in detail with reference to the figures in the following.

Figure 1:
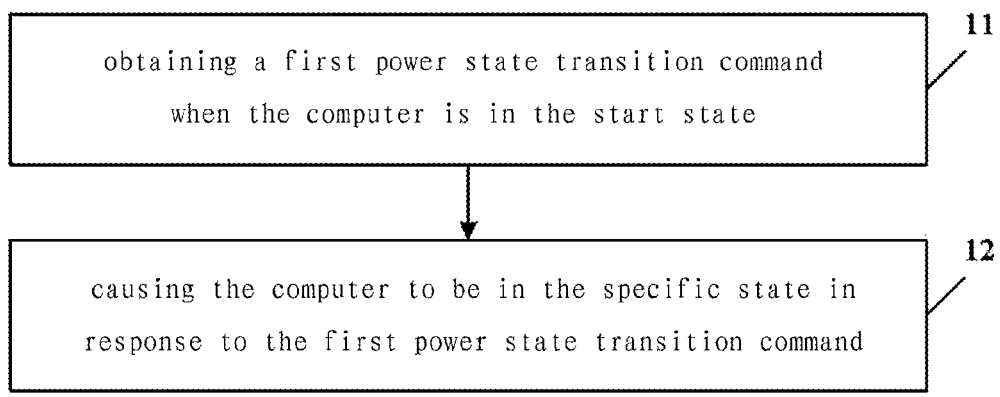
FIG. 1 is a flowchart schematically showing a computer state transition method according to an embodiment of the disclosure.

The computer state transition method according to an embodiment of the present disclosure is applied to a computer. The power consumption of the computer is a first power consumption when it is in a suspend-on-RAM (STR) state. The time consumption of the computer is a first time consumption when it transits from the suspend-to-disk (STD) state to the start state. As shown in FIG. 1, the computer state transition method comprises the steps of:

Step 11, obtaining a first power state transition command for instructing the computer to transit from the start state to a specific state, when the computer is in the start state;

Step 12, causing the computer to be in the specific state in response to the first power state transition command;

wherein, the power consumption of the computer in the specific state is a second power consumption less than the first power consumption, and the time consumption when the computer transits from the specific state to the start state is a second time consumption less than the first time consumption.

The embodiment of the present disclosure makes the computer to enter the specific state by responding to the first power state transition command. The power consumption in the specific state is less than that in the S3 state, and the recovery speed in the specific state is faster than that in the hard disk STD state. Thus, the balance between the recovery speed and the power consumption is achieved.

In the embodiment of the present disclosure, the specific state is different from any state defined by the ACPI (Advanced Configuration and Power Interface).

Of course, after the system transits to the specific state in the embodiment of the present disclosure from the start state, it needs to transit from the specific state to the start state when the user needs to continue using the computer. Therefore, the computer state transition method according to the embodiment of the present disclosure further comprises:

obtaining a second power state transition command for instructing the computer to transit from the specific state to the start state, when the computer is in the specific state;

recovering the computer to be in the start state in response to the second power state transition command.

When the system enters the S3 state from the start state, in order for the system to recover fast, the PCH, the memory unit (referred to as memory) and the memory controller will be supplied with power, to ensure the fast recovery of the system.

When the system enters the S4 state from the start state, in order for the system to recover fast, all information will be stored in the hard disk, and the hard disk is maintained in a state that can be waked up. When the hard disk is not read or written, its power consumption is low. However, since it is necessary to copy the data written in the hard disk to the memory for the recovery of the system, its startup speed is slow.

In the embodiment of the present disclosure, there are three ways to ensure that the power consumption of the computer in the specific state is less than that in the S3 state, and the recovery speed from the specific state to the start state is faster than that from the S4 state, which will be described in detail as follows, respectively.

In the following description, there is no difference between the closing of the OS and the application in the present embodiment and the existing S3 process. That is, the OS and the application are closed, and the data in the memory is maintained unchanged. Therefore, it will not be described in the following.

<The First Way>

In the first way, the state information of a Platform Controller Hub (PCH) is stored in a Non-Volatile Random Access Memory (NVRAM). In the startup process, the system is recovered by reading the information from the NVRAM. As for the memory and the memory controller, they maintain unchanged with respect to the S3 state. In this case, the step of causing the computer to be in the specific state in response to the first power state transition command comprises:

storing the configuration information of a peripheral device in a memory;

storing state information of a Platform Controller Hub (PCH) to a Non-Volatile Random Access Memory (NVRAM);

controlling the power supply so that only the power supplies to the memory and a memory controller are maintained;

the step of recovering the computer to be in the start state in response to the second power state transition command comprises:

recovering all the power supplies;

reading out the PCH state information from the NVRAM and recovering the PCH state configuration in accordance with the read PCH state information;

recovering configuration of the peripheral device in accordance with the configuration information recorded in the memory; and recovering an operating system and an application in accordance with data recorded in the memory.

The detailed description is as follows.

After obtaining the first power state transition command which may be transmitted in various ways (and there is no other difference from the existing instruction for switching to the S3 state except for the content of the instruction, and thus will not be described here in detail), firstly, all the information of the application in the running state will be written into the memory before the application is closed. Further, the configuration information on all the peripheral devices, such as the network card, the display card, etc., will be stored into the memory. Then, the state information of the PCH will be stored in the NVRAM. However, since the recovery of the computer needs not only the PCH state information, but also the state of the application before closed, the configuration information of the peripheral device etc., which are stored in the memory, the memory and the memory controller are supplied with power, while the other devices are powered off, when controlling the power supply in the embodiment of the present disclosure.

Therefore, after entering the specific state, only the memory and the memory controller are supplied with power. Compared with S3 state, at least the PCH is not supplied with power, and thus the power consumption is reduced.

In the following, the recovery process will be described in detail.

When obtaining the second power state transition command, all the power supplies are recovered. Of course, since the memory and the memory controller are always supplied with power, so it only needs to recover the power supply to the other hardware. After the power supply is recovered, the PCH state information will be read out from the NVRAM, and the PCH state configuration will be recovered according to the read PCH state information. Then, the other hardware devices will be initialized, and the configuration will be recovered. Since the configuration information of the peripheral device has been stored in the memory, the configuration of the peripheral device is recovered by reading out this data from the memory directly. Of course, it should be understood that the memory cannot be initialized in the whole recovery process, in order to avoid any loss of the data to result in the recovery failure.

After all devices are recovered, any task can be processed, and the final operation is to recover the OS and the application with the recovered devices, the process of which is of no difference from that of S3 process, and will not be described here in detail.

Compared to S4, in the method according to the embodiment of the present disclosure, most information related to the recovery is stored in the memory, and the memory is always supplied with power, so the data in the recovery process is obtained directly from the memory, and it is not necessary to load the data from the hard disk to the memory. Thus, the recovery speed is greatly improved compared to that from the S4 state.

<The Second Way>

As mentioned before, the power consumption in the S3 state is resulted from at least three parts: the memory, the memory controller and the PCH. Considering the recovery speed, the memory cannot be powered off. Therefore, in the second way, not only the PCH, but also the memory controller, is powered off, to further reduce the power consumption.

In the embodiment of the present disclosure, it requires the memory controller to be powered off. However, the data usually used in the memory is stored by means of the capacitance characteristic and the capacitor will discharge, so it needs to be charged continuously if the data is to be maintained. Normally, the memory needs to be refreshed periodically, otherwise the data will be lost. Therefore, if the memory controller is powered off, it requires a mechanism to ensure that the data in the memory is not lost. In the embodiment of the present disclosure, it ensures that the data in the memory is not lost by setting the memory to be in the Self-Refresh mode.

After the memory enters into the self-refresh mode, the data information in the memory will not be lost.

In the second way, the step of causing the computer to be in the specific state in response to the first power state transition command comprises:

storing configuration information of a peripheral device in a memory;

setting the memory to be in a self-refresh mode;

storing state information of a Platform Controller Hub (PCH) to a Non-Volatile Random Access Memory (NVRAM);

controlling the power supply so that only the power supply to the memory is maintained.

The step of recovering the computer to be in the start state in response to the second power state transition command comprises:

recovering all the power supplies;

reading out the PCH state information from the NVRAM and recovering the PCH state configuration in accordance with the read PCH state information;

switching the memory from the self-refresh mode into a normal mode, and ensuring data recorded in the memory unchanged;

recovering configuration of the peripheral device in accordance with the configuration information recorded in the memory; and recovering the operating system and an application in accordance with the data recorded in the memory.

In the state switching process to the predetermined state, the memory is set in the self-refresh mode, and only the memory units are supplied with power. When the user desires the computer to be recovered, the only difference from the first way is in that the memory needs to be switched from the self-refresh mode to the normal mode before the data in the memory is read out for the recovery process, and thus the other process will not be described here in detail.

<The Third Way>

The power supply to the PCH may be saved in the above first way, and the power supplies to the PCH and the memory controller may be saved in the above second way. It should be understood that only the power supplies to the PCH and the memory may be maintained from the viewpoint of the power consumption in the embodiment of the present disclosure.

In this way, the step of causing the computer to be in the specific state in response to the first power state transition command comprises:

storing configuration information of a peripheral device in a memory;

setting the memory to be in a self-refresh mode;

controlling the power supply so that only the power supplies to the memory and a Platform Controller Hub (PCH) are maintained;

The step of recovering the computer to be in the start state in response to the second power state transition command comprises:

recovering all the power supplies;

switching the memory from the self-refresh mode into a normal mode, and ensuring data recorded in the memory unchanged;

recovering configuration of the peripheral device in accordance with the configuration information recorded in the memory; and recovering an operating system and an application in accordance with the data recorded in the memory.

The difference between this way and the second way is in that it is not necessary to carry out any operation on the PCH, and it only requires to control the mode of the memory. Compared to that in S3 state, is does not need to supply the memory controller with power, thus the power consumption is also reduced to some extent.

In either way described above, since most information related to the recovery is stored in the memory, and the memory is always maintained to be supplied with power, the data for the recovery process is obtained from the memory directly, and it does not need to load the data from the hard disk to the memory. Therefore, the recovery speed is greatly improved compared to that from the S4 state.

Of course, there are many existing power management states S0-S5. Considering the computer is capable of knowing which process to follow for the recovery operation in the recovery process, in the step of causing the computer to be in the specific state in response to the first power state transition command, a state identifier identifying that the computer has been transited to the specific state is further stored at a predetermined location. In the step of obtaining the second power state transition command when the computer is in the specific state, the computer is determined to be in the specific state based on the state identifier.

Figure 2:
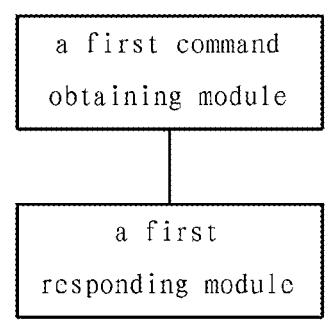
FIG. 2 is a flowchart schematically showing a computer state transition apparatus according to an embodiment of the present disclosure.

The computer state transition apparatus according to the embodiment of the present disclosure is applied to a computer. The power consumption of the computer is a first power consumption when it is in a suspend-on-RAM (STR) state. The time consumption of the computer is a first time consumption when it transits from the suspend-to-disk (STD) state to the start state. As shown in FIG. 2, the computer state transition apparatus comprises:

a first command obtaining module configured for obtaining a first power state transition command for instructing the computer to transit from the start state to a specific state, when the computer is in the start state; and a first responding module configured for causing the computer to be in the specific state in response to the first power state transition command;

wherein, the power consumption of the computer in the specific state is a second power consumption less than the first power consumption, and the time consumption when the computer transits from the specific state to the start state is a second time consumption less than the first time consumption.

The computer state transition apparatus further comprises:

a second command obtaining module configured for obtaining a second power state transition command for instructing the computer to transit from the specific state to the start state, when the computer is in the specific state; and a second responding module configured for recovering the computer to be in the start state in response to the second power state transition command.

In the computer state transition apparatus, the first responding module may comprise:

a first saving unit configured for storing configuration information of a peripheral device in a memory;

a second saving unit configured for storing state information of a Platform Controller Hub (PCH) to a Non-Volatile Random Access Memory (NVRAM);

a first power supply controller configured for controlling the power supply so that only the power supplies to the memory and a memory controller are maintained;

The second responding module may comprise:

a first recovering module configured for recovering all the power supplies;

a second recovering module configured for reading out the PCH state information from the NVRAM and recovering the PCH state configuration in accordance with the read PCH state information;

a third recovering module configured for recovering configuration of the peripheral device in accordance with the configuration information recorded in the memory; and a fourth recovering module configured for recovering an operating system and an application in accordance with data recorded in the memory.

In the computer state transition apparatus, the first responding module may further comprise:

a first saving unit configured for storing configuration information of a peripheral device in a memory;

a first memory mode setting module configured for setting the memory to be in a self-refresh mode;

a second saving unit configured for storing state information of a Platform Controller Hub (PCH) to a Non-Volatile Random Access Memory (NVRAM);

a second power supply controller configured for controlling the power supply so that only the power supply to the memory is maintained;

The second responding module may further comprise:

a first recovering module configured for recovering all the power supplies;

a second recovering module configured for reading out the PCH state information from the NVRAM and recovering the PCH state configuration in accordance with the read PCH state information;

a second memory mode configuring module configured for switching the memory from the self-refresh mode into a normal mode, and ensuring data recorded in the memory unchanged;

a third recovering module configured for recovering configuration of the peripheral device in accordance with the configuration information recorded in the memory; and a fourth recovering module configured for recovering an operating system and an application in accordance with the data recorded in the memory.

In the computer state transition apparatus, the first responding module may comprise:

a first saving unit configured for storing configuration information of a peripheral device in a memory;

a first memory mode setting module configured for setting the memory to be in a self-refresh mode;

a third power supply controller configured for controlling the power supply so that only the power supplies to the memory and a Platform Controller Hub (PCH) are maintained.

The second responding module may further comprise:

a first recovering module configured for recovering all the power supplies;

a second memory mode setting module configured for switching the memory from the self-refresh mode into a normal mode, and ensuring data recorded in the memory unchanged;

a third recovering module configured for recovering configuration of the peripheral device in accordance with the configuration information recorded in the memory; and a fourth recovering module configured for recovering an operating system and an application in accordance with the data recorded in the memory.

Another computer state transition method according to the embodiment of the present disclosure comprises:

storing a preset startup identifier after receiving a predetermined command;

storing configuration information of a peripheral device in a memory;

storing PCH state information in a NVRAM, to ensure that the computer can recover the PCH state configuration according to the PCH state information in the startup process;

controlling the power supply so that only the memory is supplied with power, or only the memory and the memory controller are supplied with power.

In the step of controlling the power supply, only the memory is supplied with power. In this case, the computer state transition method further comprises:

setting the memory in the self-refresh mode.

The recovery process of the computer state transition method comprises:

reading a startup identifier after receiving the start command;

recovering all the power supplies when the read startup identifier is the preset startup identifier;

reading the PCH state information in the NVRAM, and recovering the PCH state configuration according to the read PCH state information;

switching the memory from the self-refresh mode to the normal mode;

recovering the OS and the application according to the data recorded in the memory.

A computer according to the embodiment of the present disclosure is provided. The power consumption of the computer is a first power consumption when it is in a suspend-on-RAM (STR) state. The time consumption of the computer is a first time consumption when it transits from the suspend-to-disk (STD) state to the start state. The computer comprises:

a first command obtaining module configured for obtaining a first power state transition command for instructing the computer to transit from a start state to a specific state, when the computer is in the start state;

a first responding module configured for causing the computer to be in the specific state in response to the first power state transition command;

wherein, the power consumption of the computer in the specific state is a second power consumption less than the first power consumption; the time spent by the computer on switching from the specific state to the startup state is a second duration less than the first duration.

The computer further comprises:

a second command obtaining module configured for obtaining a second power state transition command for instructing the computer to transit from the specific state to the start state, when the computer is in the specific state;

a second responding module configured for causing the computer to be in the start state in response to the second power state transition command.

The computer further comprises:

a central processing unit;

a memory;

a memory controller;

a NVRAM;

an embedded controller; and a BIOS;

the CPU stores the configuration information of the peripheral device to the memory in response to the first power state transition command;

the BIOS sets the memory to the self-refresh mode;

the BIOS further stores the state information of the PCH to the NVRAM;

the embedded controller controls the power supply so that only the memory is supplied with power;

the embedded controller further recovers all the power supplies in response to the second power state transition command;

the BIOS further reads out the PCH state information from the NVRAM, and recovers the PCH state configuration according to the read PCH state information;

the BIOS further switches the memory from the self-refresh mode to the normal mode, recovers the configuration of the peripheral device according to the configuration information recorded in the memory, and recovers the OS and the application according to the data saved in the memory;

wherein, in the process of recovering the OS and the application by the BIOS according to the data saved in the memory, the BIOS will transfer the control when the first row of code specifying the OS is executed, so that the OS runs and recovers to the previous state, and then the OS recovers the application.

Of course, it should be understood that the operations of the BIOS requires the cooperation with the CPU, which is familiar to those skilled in the art, and will not be described here in detail.

In the following, the startup method and the startup system according to the embodiment of the present disclosure will be described with reference to FIGS. 3-5.

The fast startup method of a computer according to an embodiment of the present disclosure comprises the steps of:

switching a hardware device from a start running state into a specific state different from a first state such as the power-off, the hibernation or the sleep, when determining that an operating system is executing a state switch action, such as a corresponding power-off, a hibernation or a sleep action, in the start running state to quit the control to the hardware device and is to make the hardware device to enter the first state, wherein the initialization time necessary for the hardware device to startup to the normal running from the specific state is a first duration, the initialization time necessary for the hardware device to startup to the normal running from the first state is a second duration, and the first duration is less than the second duration;

starting up the hardware device from the specific state, when determining that the hardware device carries out a re-start or wake up operation.

With the fast startup method according to the embodiment of the present disclosure, when the power-off, hibernation or sleep operation is carried out under the OS by the user, the hardware device does not enter the first state in which the hardware device stops operating directly according to the instruction of the OS, but enters the specific state, wherein the initialization time necessary for the hardware device to startup to the normal operation from the specific state is a first duration, the initialization time necessary for the hardware device to startup to the normal operation from the first state is a second duration, and the first duration is less than the second duration. In this way, the hardware device starts up from the specific state the next time when it starts, and skips the initialization time necessary for the hardware when starting up from the first state, and the startup speed is greatly improved.

The fast startup method does not require a fixed hardware configuration, and thus is suitable for the computer system with any configuration.

Those skilled in the art may understand that, based on the Advanced Configuration and Power Interface (ACPI) specification, the hardware system may enter into five levels of states representing different levels of off state of the hardware system: sleep1(S1), sleep2(S2), sleep3(S3), sleep4(S4) and sleep5(S5), respectively, according to the instruction of the OS, when the OS performs state switching operations such as the power off, the hibernation, the standby or the sleep.

S1 state: the CPU stops working, the other hardware devices still operate as usual, and requires a wakeup time approximate to 0 second;

S2 state: the CPU is off, the other hardware devices still operate as usual, and requires a wakeup time longer than that in S1 state, which is of a millisecond level;

S3 state: normally called as the STR (Suspend to RAM), which writes the data in operation into the memory and shuts down the hard disk, it requires a wakeup time of several hundred millisecond order;

S4 state: also called as the STD (Suspend to Disk), which writes the memory information into the hard disk, and all the components stops operating, which is called as the hibernation state. It requires a wakeup time of a second order;

S5 state: all the hardware devices including the power shut down, which is also called as the power-off state.

Usually, the hardware system is required to enter into S1, S2 or S3 state when the OS enters into the standby state, is required to enter into S4 state when the OS enters into the hibernation state, is required to enter into S5 state when the OS enters into the power off state; is required into S3 state first when the OS enters into the sleep state, and is switched into the S4 state when no wakeup request is received for a period of time in the S3 state.

However, when the OS enters into the standby state and requires the hardware system to enter into S1, S2 or S3 state, since most hardware devices still operate normally, there is not much hardware initialization when being waken up again, the startup speed is quite fast and it is not necessary to further optimize the startup speed. Therefore, the fast startup method according to the embodiment of the present disclosure is applied only when the OS switches from the start running state into the power-off, the hibernation or the sleep state to cause the hardware system to be into S4 or S5 state. Thus, in the embodiment of the present disclosure, the first state into which the hardware device is required to enter by the OS after being powered off only represents the S4 and S5 states defined by the APCI specification, and does not represent S1, S2 and S3 states.

The S1, S2 and S3 states defined in the APCI specification are all referred to as the standby state. The description related to the standby state in the present disclosure comprises the S1, S2 and S3 states defined in the APCI specification. Therefore, in the embodiment of the present disclosure, the first state is S4 or S5 state, i.e., the hibernation state or the power off state. The specific state is the standby state, comprising S1, S2 and S3 states.

In the following, the operation flowchart when the computer shuts down and when the computer starts when the fast startup of the embodiment of the present disclosure is applied will be described in detail, respectively.

Figure 3:
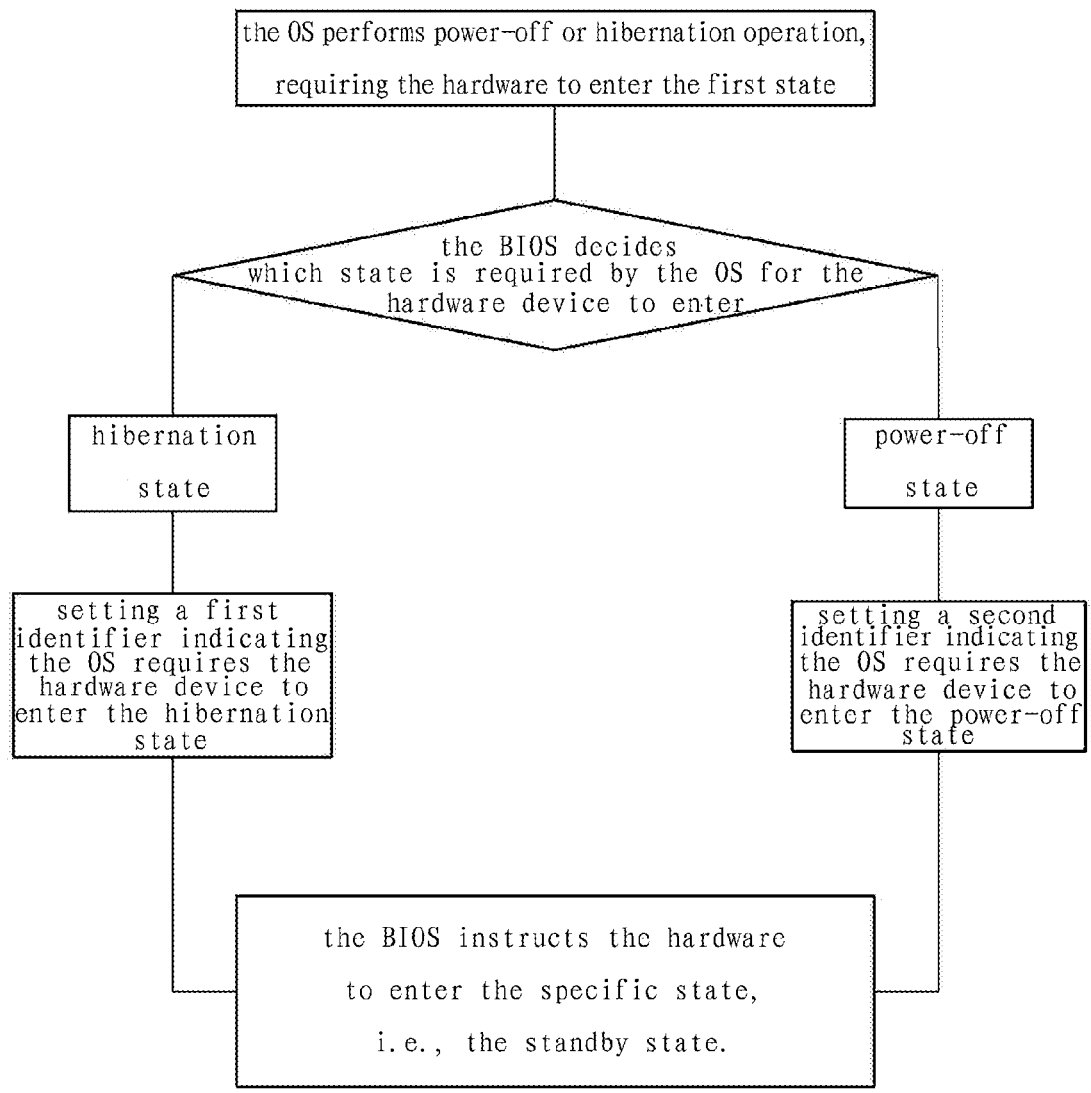
FIG. 3 is a flowchart showing the operations when the computer is switching states by a startup method according to an embodiment of the present disclosure.

FIG. 3 is a schematic diagram showing the operation flowchart when the computer shuts down, which comprises the steps of:

the OS carries out the power-off or the hibernation operation, and requires the hardware device to enter into the first state corresponding to the power-off or the hibernation;

the BIOS intercepts and responds to the operation of the OS, and judges into which state the OS is to enter, so as to determine into which state the OS requires the hardware to enter;

when it is determined that the OS enters into the hibernation state, it represents that the OS requires the hardware device to enter into the S4 state. Then, a first identifier is set for recording the S4 state which is required for the hardware device to enter by the OS. Since the state entered by the OS corresponds to the state entered by the hardware device, the first identifier also records that the OS enters into the hibernation state;

when it is determined that the OS enters into the power-off state, it represents that the OS requires the hardware device to enter into the S5 state. Then, a second identifier is set up for recording the S5 state which is required for the hardware device to enter by the OS. Since the state entered by the OS corresponds to the state entered by the hardware device, the second identifier also records that the OS enters into the power-off state.

That is, different identifiers are used in the BIOS to record the state into which the hardware device is desired to enter by the OS.

Then, the BIOS modifies the operation instruction of the OS. No matter which level of shutdown state among the hibernation and the power-off the OS desires the hardware system to enter into, the hardware device is instructed to enter into the specific state, i.e., is instructed to enter into the standby state.

With the above steps, after the OS of the computer performs the power-off or the hibernation operation, no matter which level of state the OS desires the hardware device to enter into, the BIOS makes the hardware device to perform the standby operation and enter into the standby state.

Further, by setting the identifier, the hardware device is able to determine the operation before the OS performs the state switching according to the identifier, when it starts up again. When the identifier is recorded comprising the first identifier, it represents that the OS entered into the hibernation state. When the identifier is recorded comprising the second identifier, it represents that the OS entered into the power-off state. When there is no identifier set, it represents that the OS enters into other states such as the standby state. Thus, there will be no mistake in the loading or the wakeup operation of the OS.

Figure 4:
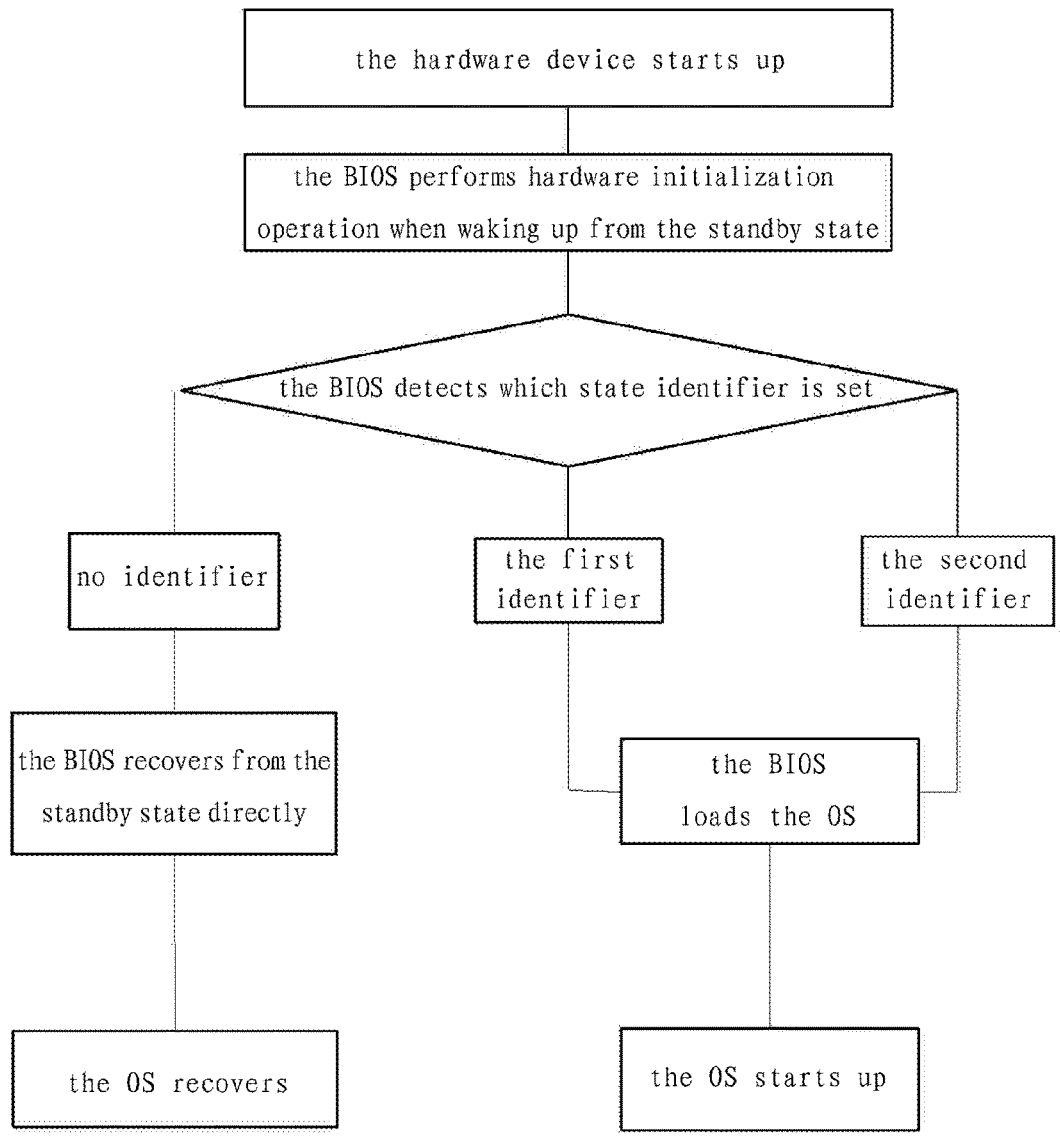
FIG. 4 is a flowchart showing the operations when the computer is starting or waking up by a startup method according to an embodiment of the present disclosure.

FIG. 4 is a schematic diagram showing the operation flowchart when the computer starts or wakes up when the fast startup method of the embodiment of the present disclosure is applied, which comprises the steps of:

the hardware device is powered on to start;

the BIOS carries out the hardware initialization operation on the hardware device when it is waken up from the standby state;

the BIOS detects the identifier recording the state which the OS enters into when powering off or hibernating, so as to determine the state into which the hardware device is desired to enter by the OS when shutting down or hibernating the last time;

when there is no identifier, it represents that the OS performs the standby command, the hardware device enters into the standby state, and the BIOS does not modify the previous instruction of the OS. Then, the BIOS performs the normal startup operation from the standby state, and wakes up the OS from the standby state;

when the identifier is the first identifier, it represents that the OS performs the hibernation instruction the last time, and requires the hardware to enter into the hibernation state. Then, the BIOS performs the operation of loading the OS, and restarts the OS;

when the identifier is the second identifier, it represents that the OS performs the power-off instruction the last time, and requires the hardware system to enter into the power-off state. Then, the BIOS also performs the operation of loading the OS, and restarts the OS.

Since the hardware device enters into the standby state when the OS shuts down the last time, the hardware device starts up from the standby state when it starts again. The hardware initialization process when starting up from the power-off state is skipped, and the startup speed of the computer is improved.

The so called "loading" of the OS in the embodiment of the present disclosure means the process of loading runtime data, driver, etc., into the memory. The so called "waking up" of the OS means the process of recovering the data of the OS from the memory in the standby state. Since the runtime data is still stored in the memory when the OS stands by, it only requires to recover the data from the memory when "waking up", and does not need to re-load.

Those skilled in the art may understand the difference between the "waking up of the OS" and the "loading of the OS" in the present disclosure, and it will not be described here in detail.

Moreover, the BIOS uses different identifiers to record the state into which the OS enters when it performs the power-off operation, when the computer powers off, so that the BIOS starts up the OS according to the recorded identifier when the computer restarts. There may be various ways to realize the identifier used by the BIOS for recording the state into which the OS enters when it performs the power-off operation, and it may be set up in advance. For example, the rule for setting the identifier by the BIOS may be that, different identifiers are set up when the OS enters into the hibernation state, the power-off state and the standby state. Even more, the BIOS may set different identifiers for each state of S0-S5 defined in ACPI specification.

Figure 5:
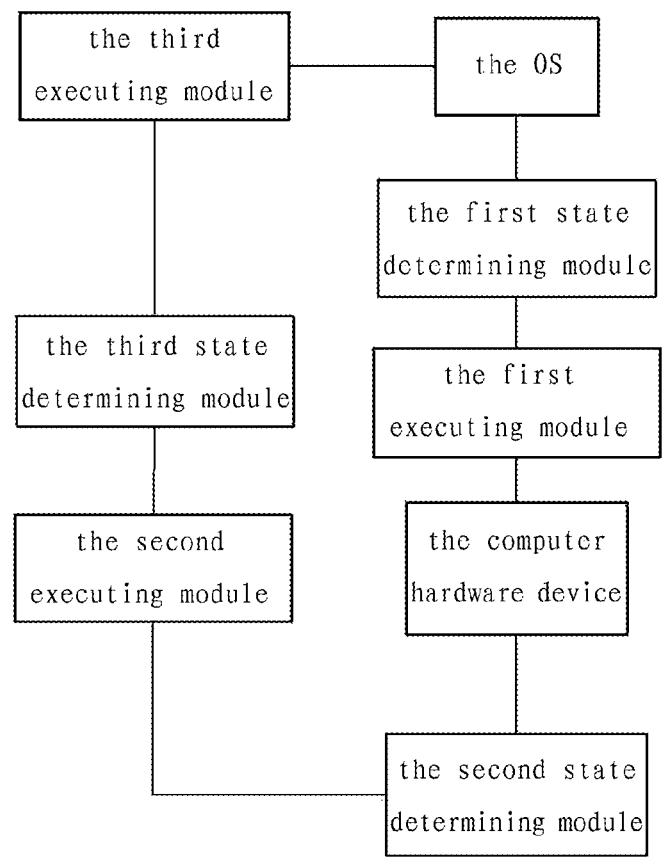
FIG. 5 is a structural diagram schematically showing a startup apparatus according to an embodiment of the present disclosure.

As shown in FIG. 5, a (fast) startup apparatus of a computer is provided in another aspect of the present disclosure, which comprises:

a first state determining module configured for determining the operating state of an operating system and detecting the operation the OS is to perform, comprising detecting the power state etc.;

a first executing module configured for switching a hardware device from a start running state into a specific state different from a first state, when determining that an operating system is executing the power-off or the hibernation action in the start running state, wherein the initialization time necessary for the hardware device to startup to the normal running from the specific state is a first duration, the initialization time necessary for the hardware device to startup to the normal running from the first state is a second duration, and the first duration is less than the second duration;

a specific state determining module configured for determining the running state of the hardware device when starting; and a second executing module configured for starting up the hardware device from the specific state, when determining that the hardware device executes a restart action, and performs the hardware initialization action necessary for starting up from the specific state.

In the embodiment of the present disclosure, the first state is S4 or S5 state, i.e., the hibernation state or the power-off state, and the specific state is the standby state.

The first executing module is further configured for setting an identifier for identifying the first state, in order to record the state into which the hardware device is required to enter by the OS when it performs the power-off or the hibernation action. The meaning of the identifier may be set in advance, for example, it may be set in such a way that different identifiers record different states into which the hardware device is required to enter when the OS performs the power-off, the hibernation, the standby operation. Alternatively, it may be set in such a way that the identifier is only set when the OS enters into the hibernation state and the power-off state, and no identifier is set when the OS enters into the standby state.

The startup apparatus further comprises a third state determining module configured for detecting the identifier to determine whether the identifier represents that the first state is the hibernation state or the power-off state, when the hardware device restarts.

The startup apparatus further comprises a third executing module configured for reloading the operating system when the determination result of the third state determining module is positive, and waking up the operating system directly from the standby state when the determination result of the third state determining module is negative.

With the fast startup system of the embodiment of the present disclosure, when the first state determining module determines that the OS performs a power-off operation in the start running state, no matter which level of state the OS desires the hardware device to enter into, the first executing module makes the hardware device to switch from the start running state to the standby state, and set an identifier for recording the first state at the BIOS. When the specific state determining module determines that the hardware device restarts, the hardware device is made to start up from the standby state by the second executing module, and the third executing module determines whether to performs the operation of reloading the OS based on the identifier recording the state in which the hardware device is required to enter by the OS when the OS performs the exiting operation.

In the embodiment of the present disclosure, the first state determining module, the first executing module, the specific state determining module, the second executing module, the third state determining module and the third executing module may be functional modules in the BIOS respectively, or alternatively may be functional modules driven by the system or independently from the BIOS.

With the fast startup system according to the embodiment of the present disclosure, since the hardware device enters into the standby state when the OS performs the exiting operation the last time, it starts up from the standby state when starting again. The hardware initialization process starting from the power-off state is skipped, and the startup speed of the computer is improved.

A startup system of a computer is provided in another aspect of the embodiment of the present disclosure, comprising:

a first startup unit configured to startup the computer to the running state from the power-off state in a normal way;

a second startup unit comprising:

a first state determining module configured to determine the operation state of the OS and the state of the power;

a first executing module configured to switch the hardware device from the start running state to a specific state different from the first state when the first state determining module determines that the OS performs the state switching operation in the start running state, exits the control to the hardware device and makes the hardware device to enter the first state; wherein, the initialization time necessary for the hardware device to startup from the specific state to the normal running state is a first duration, the initialization time necessary for the hardware device to startup from the first state to the normal running state is a second duration, and the first duration is shorter than the second duration;

a specific state determining module configured to determine the state of the hardware device;

a second executing module configured to make the hardware device to startup from the specific state when the specific state determining module determines that the hardware device performs the restart operation.

Further, the startup system comprises: a startup mode selection unit providing a first selection mode and a second selection mode selectable by the user; the startup system makes the first startup unit to perform when the user selects the first selection mode, and makes the second startup unit to perform when the user selects the second selection mode.

The startup mode selection unit may be present in a way of a selection button on the casing of the computer, comprising two option keys; the first startup unit is executed when the first option key is pressed; and the second startup unit is executed when the second option key is pressed; further, the startup mode selection unit may be present in a way of a selection menu in the computer software comprising two option menus so that the user may select the first startup unit or the second startup unit from the option menus.

In the startup system of the first state determining module, the first executing module is further configured to set up an identifier recording the first state in the BIOS, to record the state into which the hardware device is required to enter when the OS performs the exiting operation; wherein, the identifier may be set up in advance; for example, it may be set up in such a way that different identifiers record different states the hardware enters into after the OS exits, or may be set up in such a way that the identifier is only be set up when the OS requires the harder device enters into the hibernation state and the power-off state, and is not set up when the OS enters into the standby state.

Further, the second startup unit comprises:

a third state determining module configured to detect the identifier and determines whether the identifier represents that the first state is the hibernation state or the shutdown state, when the hardware device restarts;

a third executing module configured to reload the OS when the determination result of the third state determining module is positive, and wake up the OS from the standby state when the determination result of the third state determining module is negative.

With the startup system of the embodiment of the present disclosure, the user may be provided with a second startup unit which may startup the computer fast. When the user selects the second startup unit, the hardware device does not enter into the shutdown state or the hibernation state according to the instruction of the OS, but enters into the standby state, when the OS performs exiting operations such as the power-off or the hibernation operation. In this way, the hardware device starts up from the standby state when the computer starts the next time, the hardware initialization process starting up from the power-off state is skipped, and the startup speed is greatly improved.

In the embodiment of the present disclosure, the fast startup method, the fast startup system and the startup system according to the embodiment of the present disclosure are described taking the specific state being the standby state as an example. The specific state is set as the standby state only because it represents a preferred state for a fast startup, but the specific state is not limited to the standby state, and it may be the hibernation state. When the OS shuts down to enter into the first state as the power-off state, the hardware device is switched into the hibernation state instead of the normal power-off state, and the effect of fast startup may be also achieved when starting the next time. Alternatively, the specific state may also be the S1, S2 or S3 state in the standby state.

In summary, the principle of the fast startup method in the embodiment of the present disclosure is to switch the hardware device from the start running state to a specific state different from a first state when the OS performs a power-off operation and enters into the first state. The startup time from the specific state by the hardware device is shorter than that from the first state, so that the startup time is shorten when the hardware device starts again, and the startup speed is improved.

In the embodiment of the present disclosure, the module may be realized by software so as to be executed by various processors. For example, an identified executable code module may comprise one or more physical or logical units of the computer instructions, which may, for example, be constructed as an object, a process or a function. Nevertheless, the executable codes of the identified module are not necessary to be located together physically, and may comprise different instructions stored at different locations, which may construct a module and achieve the predetermined purpose of the module when being combined together logically.

In fact, the executable code module may be a single instruction or multiple pieces of instructions, and may even be distributed at multiple different code segments, different program, and across multiple memory devices. Similarly, the operation data may be identified inside the module, be realized in various suitable ways, and be recognized in a data structure of any suitable type. The operation data may be collected as a single data set, or may be distributed at different locations (at different memory devices), and may be, at least partially, present at the system or the network as an electric signal.

When the module is realized by software, considering the existing hardware manufacture process, those skilled in the art may realize its function by corresponding hardware circuits comprising the normal VLSI circuit or the existing semiconductor such as a logical chip or a transistor, or other separate elements, without the consideration of cost. The module may also be realized by a programmable hardware device, such as a field programmable gate array, a programmable array logic, or a programmable logical device, etc.

The above is only embodiments of the present disclosure. It should be noted that various modifications and alternations may be made by those of ordinary skill in the art without departing from the principle of the present disclosure, which should also be viewed as falling within the protection scope of the present disclosure.

The invention claimed is:

1. A computer state transition method applied to a computer, the power consumption of the computer is a first power consumption when the computer is in a suspend-on-RAM (STR) state, and the time consumption of the computer is a first time consumption when it transits from the suspend-to-disk (STD) state to a start state, the computer state transition method comprises the steps of:
obtaining a first power state transition command for instructing the computer to transit from the start state to a first state, when the computer is in the start state;
setting an identifier for identifying the first state;
causing the computer to be in a specific state that differs from the first state in response to the first power state transition command;
wherein, the power consumption of the computer in the specific state is a second power consumption less than the first power consumption, and the time consumption when the computer transits from the specific state to the startup state is a second time consumption less than the first time consumption, and
wherein the first state is a hibernation state or a power off state, and the specific state is a standby state.

2. The computer state transition method of claim 1, wherein, the step of causing the computer to be in the specific state in response to the first power state transition command further comprises:
storing a state identifier identifying that the computer has transited to the specific state at a predetermined location;
wherein, in the step of obtaining the second power state transition command when the computer is in the specific state, the computer is determined to be in the specific state based on the state identifier.

3. The computer state transition method of claim 1, further comprising:
obtaining a second power state transition command for instructing the computer to transit from the specific state to the start state, when the computer is in the specific state; and
recovering the computer to be in the start state in response to the second power state transition command.

4. The computer state transition method of claim 3, wherein,
the step of causing the computer to be in the specific state in response to the first power state transition command comprises:
storing configuration information of a peripheral device in a memory;
storing state information of a Platform Controller Hub (PCH) to a Non-Volatile Random Access Memory (NVRAM);
controlling the power supply so that only the power supplies to the memory and a memory controller are maintained;
the step of recovering the computer to be in the start state in response to the second power state transition command comprises:
recovering all the power supplies;
reading out the PCH state information from the NVRAM and recovering the PCH state configuration in accordance with the read PCH state information;
recovering configuration of the peripheral device in accordance with the configuration information recorded in the memory; and
recovering an operating system and an application in accordance with data recorded in the memory.

5. The computer state transition method of claim 3, wherein,
the step of causing the computer to be in the specific state in response to the first power state transition command comprises:
storing configuration information of a peripheral device in a memory;
setting the memory to be in a self-refresh mode;
storing state information of a Platform Controller Hub (PCH) to a Non-Volatile Random Access Memory (NVRAM);
controlling the power supply so that only the power supply to the memory is maintained;
the step of recovering the computer to be in the start state in response to the second power state transition command comprises:
recovering all the power supplies;
reading out the PCH state information from the NVRAM and recovering the PCH state configuration in accordance with the read PCH state information;
switching the memory from the self-refresh mode into a normal mode, and ensuring data recorded in the memory unchanged;
recovering configuration of the peripheral device in accordance with the configuration information recorded in the memory; and
recovering an operating system and an application in accordance with the data recorded in the memory.

6. The computer state transition method of claim 3, wherein,
the step of causing the computer to be in the specific state in response to the first power state transition command comprises:
storing configuration information of a peripheral device in a memory;
setting the memory to be in a self-refresh mode;
controlling the power supply so that only the power supplies to the memory and a Platform Controller Hub (PCH) are maintained;
the step of recovering the computer to be in the start state in response to the second power state transition command comprises:
recovering all the power supplies;
switching the memory from the self-refresh mode into a normal mode, and ensuring data recorded in the memory unchanged;
recovering configuration of the peripheral device in accordance with the configuration information recorded in the memory; and
recovering an operating system and an application in accordance with the data recorded in the memory.

7. A computer state transition apparatus applied to a computer, the power consumption of the computer is a first power consumption when it is in a suspend-on-RAM (STR) state, and the time consumption of the computer is a first time consumption when it transits from the suspend-to-disk (STD) state to a start state, the computer state transition apparatus comprises:

a processor and a first memory for storing a computer program to be executed by the processor to achieve the following steps:

a first command obtaining step configured for obtaining a first power state transition command for instructing the computer to transit from the start state to a specific state, when the computer is in the start state;

an identifier setting step configured for setting an identifier for identifying the first state;

a first responding step configured for causing the computer to be in a specific state that differs from the first state in response to the first power state transition command;

wherein, the power consumption of the computer in the specific state is a second power consumption less than the first power consumption, and the time consumption when the computer transits from the specific state to the start state is a second time consumption less than the first time consumption, and wherein the first state is a hibernation state or a power off state, and the specific state is a standby state.

8. The computer state transition apparatus of claim 7, wherein the computer program is executed by the processor to further achieve the following step:

a second command obtaining step configured for obtaining a second power state transition command for instructing the computer to transit from the specific state to the start state, when the computer is in the specific state; and a second responding step configured for recovering the computer to be in the start state in response to the second power state transition command.

9. The computer state transition apparatus of claim 8, wherein, the first responding step comprises:
a first saving step configured for storing configuration information of a peripheral device in a memory;
a second saving step configured for storing state information of a Platform Controller Hub (PCH) to a Non-Volatile Random Access Memory (NVRAM);
a first power supply controlling step configured for controlling the power supply so that only the power supplies to the memory and a memory controller are maintained;

the second responding step comprises:
a first recovering step configured for recovering all the power supplies;
a second recovering step configured for reading out the PCH state information from the NVRAM and recovering the PCH state configuration in accordance with the read PCH state information;
a third recovering step configured for recovering configuration of the peripheral device in accordance with the configuration information recorded in the memory; and
a fourth recovering step configured for recovering an operating system and an application in accordance with data recorded in the memory.

10. The computer state transition apparatus of claim 8, wherein, the first responding step comprises:
a first saving step configured for storing configuration information of a peripheral device in a memory;
a first memory mode setting step configured for setting the memory to be in a self-refresh mode;
a second saving step configured for storing state information of a Platform Controller Hub (PCH) to a Non-Volatile Random Access Memory (NVRAM);
a second power supply controlling step configured for controlling the power supply so that only the power supply to the memory is maintained;

the second responding step comprises:
a first recovering step configured for recovering all the power supplies;
a second recovering step configured for reading out the PCH state information from the NVRAM and recovering the PCH state configuration in accordance with the read PCH state information;
a second memory mode configuring step configured for switching the memory from the self-refresh mode into a normal mode, and ensuring data recorded in the memory unchanged;
a third recovering step configured for recovering configuration of the peripheral device in accordance with the configuration information recorded in the memory; and
a fourth recovering step configured for recovering an operating system and an application in accordance with the data recorded in the memory.

11. The computer state transition apparatus of claim 8, wherein, the first responding step comprises:
a first saving step configured for storing configuration information of a peripheral device in a memory;
a first memory mode setting step configured for setting the memory to be in a self-refresh mode;
a third power supply controlling step configured for controlling the power supply so that only the power supplies to the memory and a Platform Controller Hub (PCH) are maintained;

the second responding step comprises:
a first recovering step configured for recovering all the power supplies;
a second memory mode setting step configured for switching the memory from the self-refresh mode into a normal mode, and ensuring data recorded in the memory unchanged;
a third recovering step configured for recovering configuration of the peripheral device in accordance with the configuration information recorded in the memory; and
a fourth recovering step configured for recovering an operating system and an application in accordance with the data recorded in the memory.

12. A startup method of a computer, comprising the steps of:

setting an identifier for identifying the first state, and switching a hardware device from a start running state into a specific state different from a first state, when determining that an operating system is executing a state switch operation in the start running state to quit the control to the hardware device and is to make the hardware device to enter the first state, wherein the initialization time necessary for the hardware device to startup to the normal running from the specific state is a first duration, the initialization time necessary for the hardware device to startup to the normal running from the first state is a second duration, and the first duration is less than the second duration;

starting up the hardware device from the specific state, when determining that the hardware device executes a starting operation, deciding whether the identifier identifies that the first state is a hibernation state or a power off state, reloading the operating system if the decision is positive, and waking up the operating system from a standby state if the decision is negative.

13. A startup apparatus of a computer, comprising:

a processor and a first memory, for storing computer program to be executed by the processor to achieve the following steps:

a first state determining step configured for determining the operating state of an operating system;

a first executing step configured for setting an identifier for identifying the first state and switching a hardware device from a start running state into a specific state different from a first state, when determining that an operating system is executing a state switch action in the start running state to quit the control to the hardware device and is to make the hardware device to enter the first state, wherein the initialization time necessary for the hardware device to startup to the normal running from the specific state is a first duration, the initialization time necessary for the hardware device to startup to the normal running from the first state is a second duration, and the first duration is less than the second duration;

a specific state determining step configured for determining the state of the hardware device; and a second executing step configured for starting up the hardware device from the specific state, when the specific state determining module determines that the hardware device executes a re-start action, a third executing step configured for reloading the operating system if the decision of the third state determining module is positive, and waking up the operating system from a standby state if the decision of the third state determining module is negative.

\* \* \* \* \*